United States Patent
Futatsumori

(10) Patent No.: US 9,578,448 B2
(45) Date of Patent: Feb. 21, 2017

(54) COMMUNICATION APPARATUS, CONTROL METHOD THEREFOR, AND STORAGE MEDIUM

(71) Applicant: CANON KABUSHIKI KAISHA, Tokyo (JP)

(72) Inventor: Yuki Futatsumori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/815,273

(22) Filed: Jul. 31, 2015

(65) Prior Publication Data

US 2016/0044446 A1 Feb. 11, 2016

(30) Foreign Application Priority Data

Aug. 8, 2014 (JP) .................... 2014-163046

(51) Int. Cl.
| | |
|---|---|
| H04B 5/00 | (2006.01) |
| H04M 1/00 | (2006.01) |
| H04W 4/00 | (2009.01) |
| G06F 3/12 | (2006.01) |
| G06F 3/044 | (2006.01) |
| H04N 1/00 | (2006.01) |

(52) U.S. Cl.
CPC ............. H04W 4/008 (2013.01); G06F 3/044 (2013.01); G06F 3/1292 (2013.01); H04B 5/0025 (2013.01); H04B 5/0031 (2013.01); H04N 1/00384 (2013.01); H04N 2201/006 (2013.01); H04N 2201/0094 (2013.01)

(58) Field of Classification Search
CPC ............ H04M 1/7253; H04M 1/72519; H04M 2250/02; H04M 2250/04; H04B 5/02; H04B 5/0025; H04B 10/114; H04N 1/00307; H04N 2201/006
USPC .................... 455/41.1, 41.2, 556.1, 557, 566
See application file for complete search history.

(56) References Cited

U.S. PATENT DOCUMENTS

| 8,788,833 B2* | 7/2014 | Fukui .................... H04L 9/3226 713/182 |
| 8,879,981 B2* | 11/2014 | Fujita ..................... H04B 7/155 455/41.1 |
| 2011/0292445 A1 | 12/2011 | Kato ............................ 358/1.15 |
| 2013/0010124 A1 | 1/2013 | Shimma ..................... 348/207.2 |
| 2013/0241864 A1 | 9/2013 | Chen et al. .................... 345/174 |
| 2014/0065959 A1* | 3/2014 | Tanaka ................ H04M 1/7253 455/41.1 |
| 2014/0078094 A1 | 3/2014 | Yang ............................ 345/174 |

FOREIGN PATENT DOCUMENTS

JP 2012-069045 4/2012

OTHER PUBLICATIONS

EP Search Report—Application No. 15002119.4 dated Nov. 9, 2015.

* cited by examiner

*Primary Examiner* — Quochien B Vuong
(74) *Attorney, Agent, or Firm* — Fitzpatrick, Cella, Harper & Scinto

(57) ABSTRACT

An operation for an operation unit is detected. If the operation is detected and a communication unit executes close proximity wireless communication with an external apparatus, a confirmation screen for confirming execution of processing corresponding to the operation for the operation unit is displayed.

19 Claims, 15 Drawing Sheets

VIEW SHOWING OUTER APPEARANCE OF PRINTING APPARATUS

VIEW SHOWING UPPER PORTION OF PRINTING APPARATUS

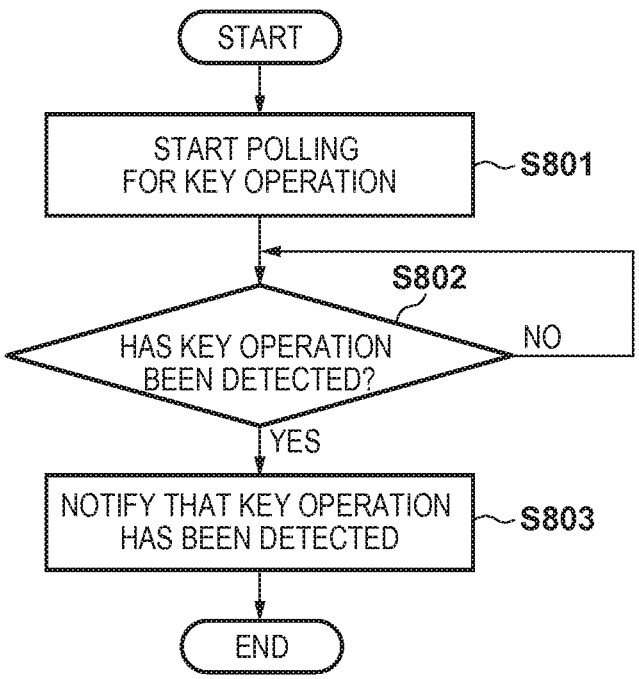
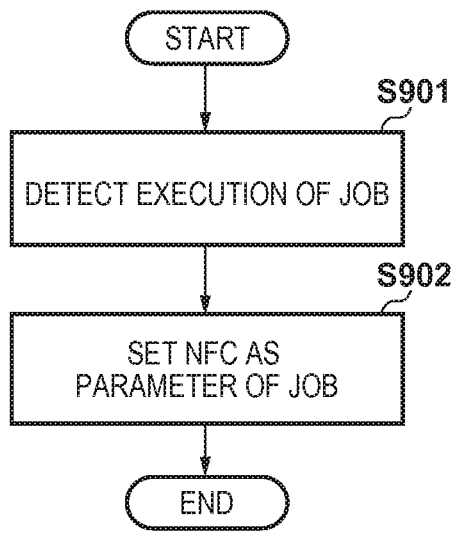
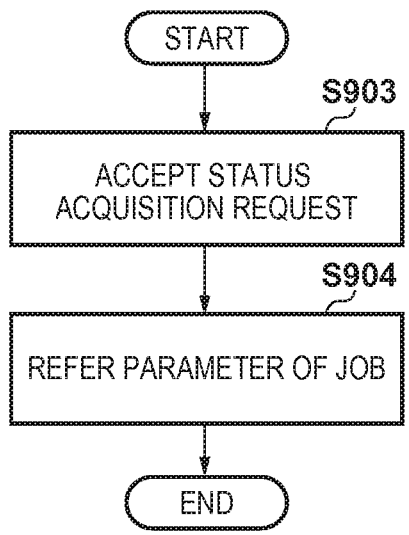

F I G. 10
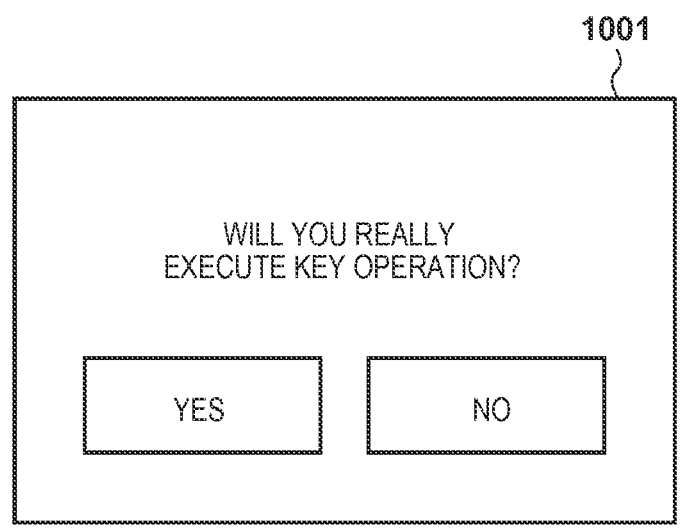

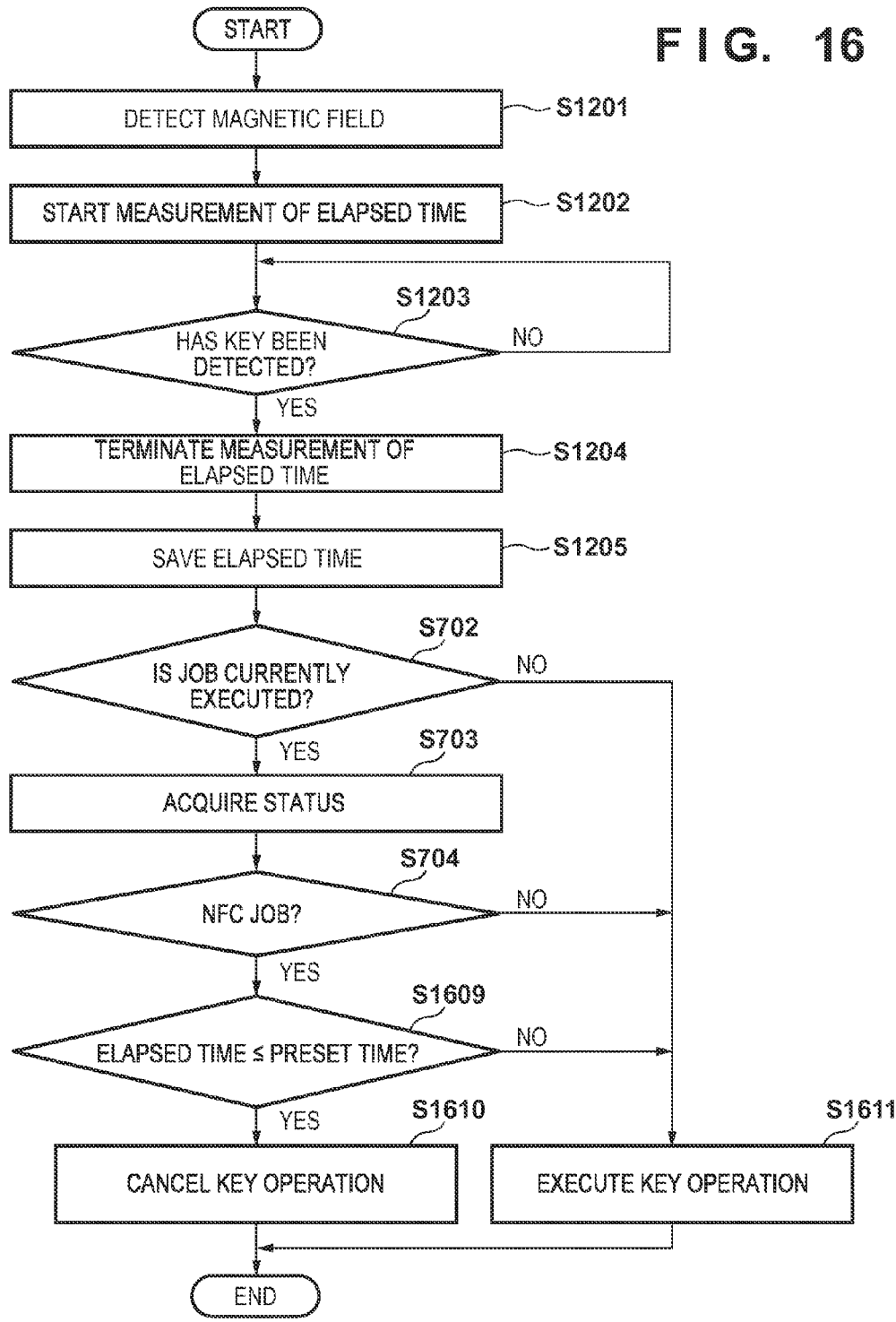
F I G. 16

DISPLAY EXAMPLE OF PRINTING APPARATUS

DISPLAY EXAMPLE OF TERMINAL APPARATUS

COMMUNICATION APPARATUS, CONTROL METHOD THEREFOR, AND STORAGE MEDIUM

BACKGROUND OF THE INVENTION

Field of the Invention

The present invention relates to a communication technique using an operation unit and a communication unit.

Description of the Related Art

In an information processing apparatus, there is known a function of performing communication using a contactless IC as a short distance wireless communication function. In an apparatus having such function, there is provided a technique of avoiding an input error by limiting input while the user rotates the apparatus (Japanese Patent Laid-Open No. 2012-069045).

As a short distance wireless communication function, for example, there is provided a system for implementing printing and scanning by bringing a terminal with an NFC (Near Field Communication) tag closer to an image forming apparatus with an NFC tag. In this system, the position of the NFC tag mounted on the image forming apparatus may be close to a specific operation key of the image forming apparatus. Therefore, depending on the model of an image forming apparatus, if a terminal is brought closer to the image forming apparatus to use the function, an operation key may respond unintentionally. If, for example, the operation key is a cancel key, an operation error for the cancel key may occur during execution of a job such as a print job or scan job, thereby canceling the job against the user's intention. This results in a disadvantage to the user, and it is thus necessary to take measures against this problem.

In Japanese Patent Laid-Open No. 2012-069045, execution of communication by the communication unit is not a condition for limiting key input. For example, it may be impossible to avoid an operation error when an external apparatus is brought closer to the apparatus for close proximity wireless communication.

The present invention has been made to solve the above problem, and provides a technique capable of preventing processing unintended by the user from being executed in processing involving communication.

SUMMARY OF THE INVENTION

According to one aspect of the present invention, there is provided a communication apparatus comprising: an operation unit configured to be operated by a user; a communication unit configured to perform close proximity wireless communication; a detection unit configured to detect an operation for the operation unit; a display unit configured to display, if the detection unit detects the operation and the communication unit executes close proximity wireless communication with an external apparatus, a confirmation screen for confirming execution of processing corresponding to the operation for the operation unit; and a control unit configured to control the processing corresponding to the operation for the operation unit in accordance with an instruction of the user for the screen displayed by the display unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 8 is a flowchart illustrating the polling processing for a key operation;

FIGS. 9A and 9B are flowcharts illustrating setting and acquisition of a job parameter;

FIG. 10 is a view showing an example of a display screen in processing according to the embodiment;

FIG. 16 is a flowchart illustrating processing executed according to the fifth embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

The relative arrangement of components, display screens, and the like set forth in the embodiments do not intend to limit the scope of the invention to them, unless otherwise specified.

<First Embodiment>

Figure 1:
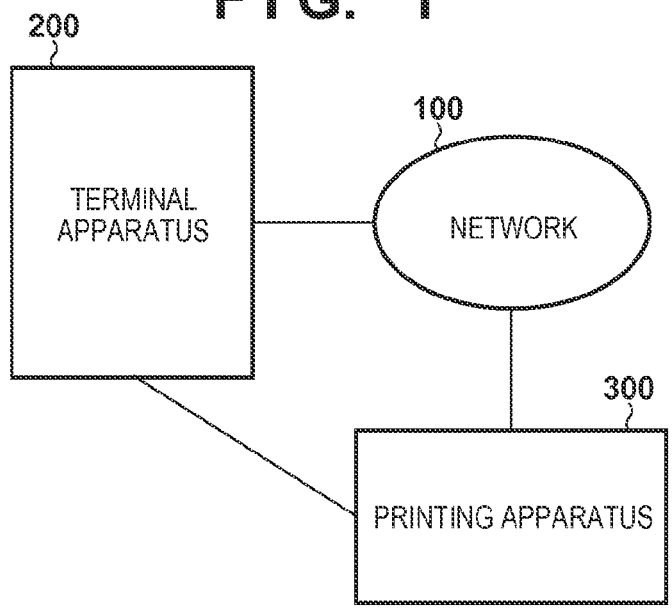
FIG. 1 is a view showing the configuration of a printing system.

FIG. 1 is a view showing the configuration of a printing system.

In this printing system, a terminal apparatus 200 and a printing apparatus 300 are connected as external apparatuses via a network 100 serving as the center. The terminal apparatus 200 also functioning as a communication apparatus includes at least two or more wireless communication units whose communication speeds are different from each other. The terminal apparatus 200 may be any apparatus which can process a file to be printed, for example, a personal information terminal such as a PDA (Personal Digital Assistant), a mobile phone, or a digital camera.

The printing apparatus 300 also functioning as a communication apparatus has a reading function of reading a document placed on a document table, and a printing function of performing printing using a print engine such as an inkjet printer, and may additionally have a FAX function and telephone function.

The network 100 and the printing apparatus 300 are connected via a wired or wireless LAN. The network 100 and the terminal apparatus 200 are connected via a wireless LAN. Since the terminal apparatus 200 and the printing apparatus 300 have a wireless LAN function, they can perform peer-to-peer (to be referred to as P2P hereinafter) communication by executing mutual authentication.

Figure 2:
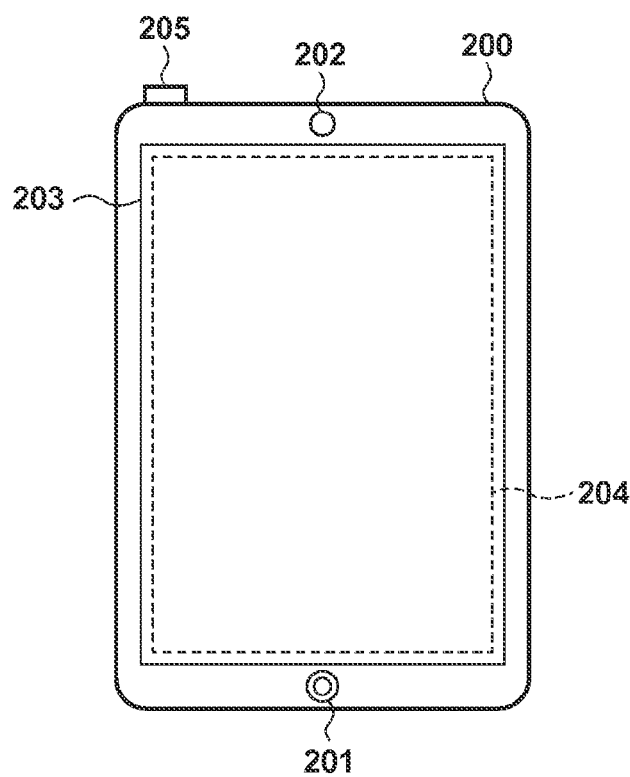
FIG. 2 is a view showing the outer appearance of a terminal apparatus.

FIG. 2 is a view showing the outer appearance of the terminal apparatus 200.

In this embodiment, a smartphone will be exemplified. The smartphone indicates a multi-function mobile phone which incorporates a camera, network browser, mail function, and the like in addition to functions of a mobile phone. An NFC unit 201 is a unit for performing communication using NFC. When the NFC unit 201 is actually brought closer to a partner NFC unit within a predetermined distance (about 10 cm), they can communicate with each other.

A wireless LAN unit 202 is a unit used to perform wireless LAN communication, and is arranged in the terminal apparatus 200. A display unit 203 is, for example, a display having an LCD display mechanism. An operation unit 204 includes a touch-panel operation mechanism, and detects pressing information of the user. As a representative operation method, the display unit 203 displays button icons and a software keyboard, and the user presses the operation unit 204, thus issuing a button pressing event. A power key 205 is used to turn on/off the power.

Figure 3A:
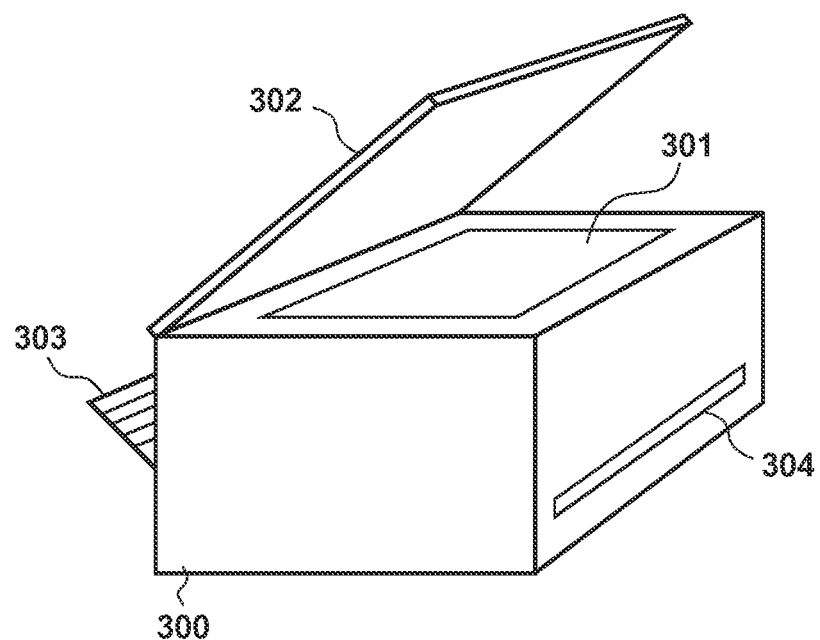
FIGS. 3A and 3B are views each showing the outer appearance of a printing apparatus.
Figure 3B:
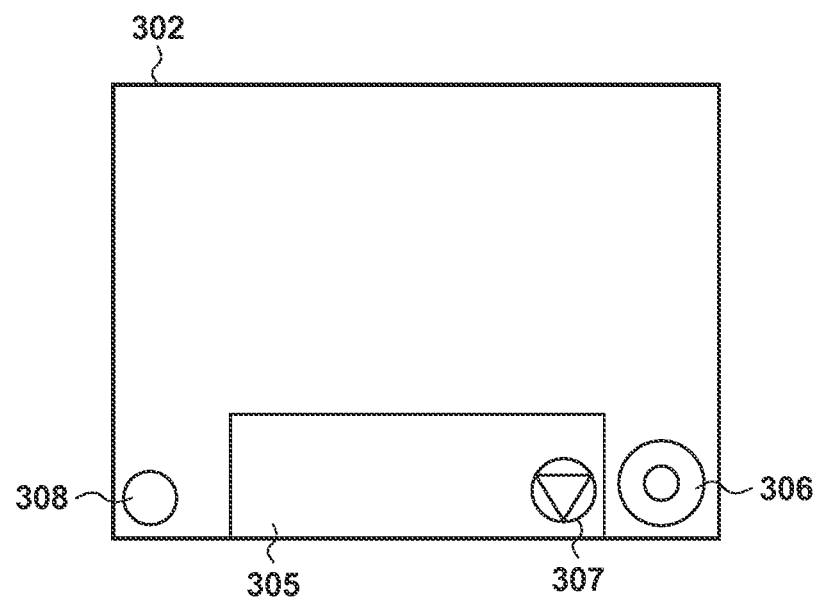

FIGS. 3A and 3B are views each showing the outer appearance of the printing apparatus.

In this embodiment, an MFP (Multi Function Printer) having the reading function (scanner) will be exemplified. Referring to FIG. 3A, a document table 301 is a glass-like transparent table which is used when a document placed on it is read by the scanner. A document cover 302 is a cover used to prevent reading light from externally leaking at the time of reading by the scanner. A printing paper insertion port 303 is an insertion port at which paper sheets of various sizes are set. Paper sheets set at the printing paper insertion port 303 are conveyed one by one to a printing unit, and are discharged from a printing paper discharge port 304 after printing is performed.

Referring to FIG. 3B, an operation display unit 305, an NFC unit 306, and a wireless LAN unit 308 are arranged on the upper portion of the document cover 302. The NFC unit 306 is a unit used to perform short distance wireless communication, and is a place where the terminal apparatus 200 is actually brought closer to the printing apparatus 300. A predetermined distance (about 10 cm) from the NFC unit 306 is an effective distance of contact. An antenna used to perform wireless LAN communication is embedded in the wireless LAN unit 308. Furthermore, an operation key 307 is arranged on the operation display unit 305. In particular, in this embodiment, assume that the operation key 307 may be incorporated very close to the NFC unit 306 (within the predetermined distance), as shown in FIG. 3B. The operation key 307 includes an electrostatic capacitance type switch. For example, it is possible to input a user instruction by detecting a change in electrostatic capacitance caused by a touch of a user's finger.

A case in which there is one operation key 307 is shown. At least one or more operation units can be formed as operation keys. Especially when the operation display unit 305 is implemented by a touch-panel operation mechanism, the operation key 307 can be implemented by a button icon or software keyboard.

Note that short distance wireless communication indicates wireless communication whose communication range is a relatively narrow predetermined range (for example, 1 m to several cm), which is represented by NFC.

Figure 4:
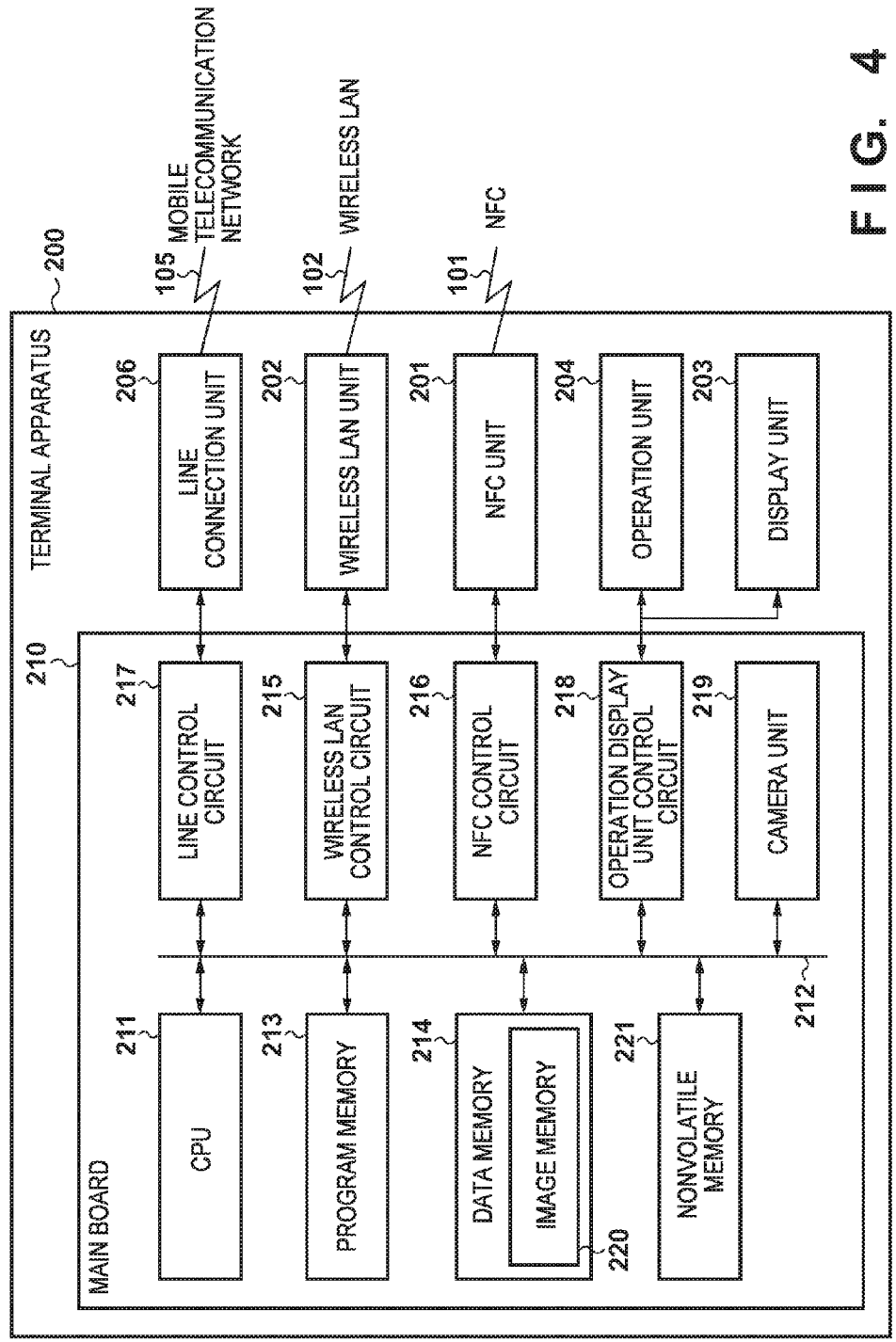
FIG. 4 is a block diagram showing the arrangement of the terminal apparatus.

FIG. 4 is a block diagram showing the arrangement of the terminal apparatus.

The terminal apparatus 200 includes a main board 210 for controlling the overall apparatus, the wireless LAN unit 202, the NFC unit 201, a line connection unit 206, the operation unit 204, and the display unit 203. Note that each of the wireless LAN unit 202, NFC unit 201, and line connection unit 206 functions as a communication unit of the terminal apparatus 200.

A CPU 211 in the form of a microprocessor arranged in the main board 210 operates according to control programs stored in a program memory 213 in the form of a ROM connected via an internal bus 212, and contents in a data memory 214 in the form of a RAM.

By controlling the wireless LAN unit 202 via a wireless LAN control circuit 215, the CPU 211 communicates with another communication terminal apparatus via a wireless LAN 102. By controlling the NFC unit 201 via an NFC control circuit 216, the CPU 211 can detect a connection with another NFC terminal via NFC 101, and transmit/receive data to/from the other NFC terminal. By controlling the line connection unit 206 via a line control circuit 217, the CPU 211 can be connected to a mobile telecommunication network 105, and make a call or transmit/receive data.

By controlling an operation display unit control circuit 218, the CPU 211 can display data on the operation unit 204, and accept an operation from the user. The CPU 211 can capture an image by controlling a camera unit 219, and store the captured image in an image memory 220 of the data memory 214. In addition to the captured image, it is possible to store, in the image memory 220, an image acquired from the outside via the mobile telecommunication network 105, wireless LAN 102, or NFC 101, and also transmit an image to the outside.

A nonvolatile memory 221 is implemented by a memory such as a flash memory, and stores data to be saved even after power-off. The nonvolatile memory 221 stores, for example, image data to be saved, and programs such as application software programs for implementing various functions of the terminal apparatus 200, in addition to address book data, various kinds of communication connection information, previously connected device information, and the like.

Figure 5:
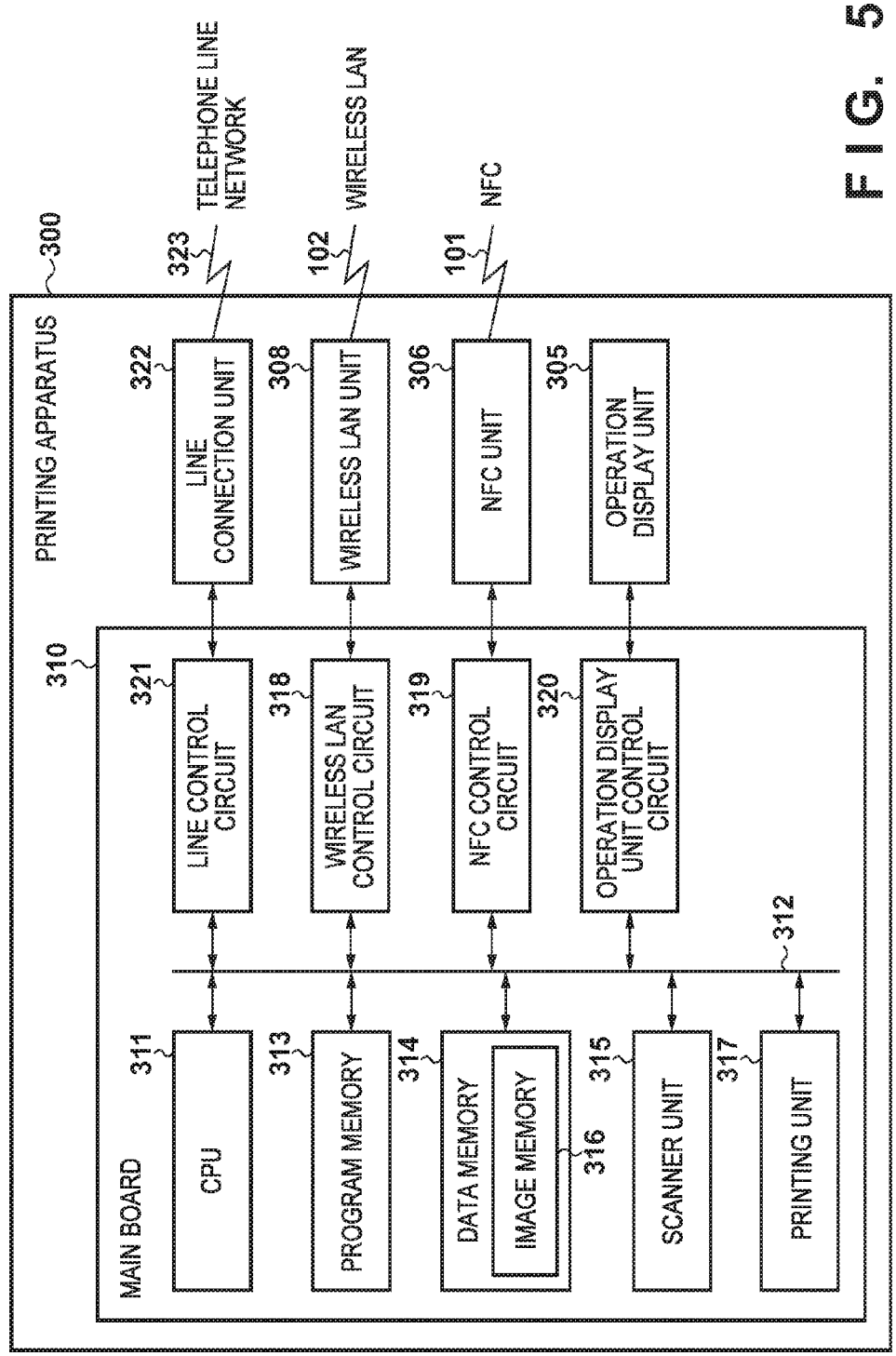
FIG. 5 is a block diagram showing the arrangement of the printing apparatus.

FIG. 5 is a block diagram showing the arrangement of the printing apparatus.

The printing apparatus 300 includes a main board 310 for controlling the overall apparatus, a line connection unit 322, the wireless LAN unit 308, the NFC unit 306, and the operation display unit 305. Note that each of the line connection unit 322, wireless LAN unit 308, and NFC unit 306 functions as a communication unit of the printing apparatus 300.

A CPU 311 in the form of a microprocessor arranged in the main board 310 operates according to control programs stored in a program memory 313 in the form of a ROM connected via an internal bus 312, and contents in a data memory 314 in the form of a RAM.

The CPU 311 controls a scanner unit 315 to read a document, and stores data in an image memory 316 of the data memory 314. The CPU 311 can control a printing unit 317 to print an image in the image memory 316 of the data memory 314 on a printing medium.

By controlling the wireless LAN unit 308 via a wireless LAN control circuit 318, the CPU 311 communicates with another communication terminal apparatus via the wireless LAN 102. By controlling the NFC unit 306 via an NFC control circuit 319, the CPU 311 can detect a connection with another NFC terminal via the NFC 101, and transmit/receive data to/from the other NFC terminal. By controlling the line connection unit 322 via a line control circuit 321, the CPU 311 can be connected to a telephone line network 323, and perform FAX transmission/reception or data transmission/reception.

By controlling an operation display unit control circuit 320, the CPU 311 can display the state of the printing apparatus 300 or a function selection menu on the operation display unit 305, and accept an operation from the user.

Figure 6:
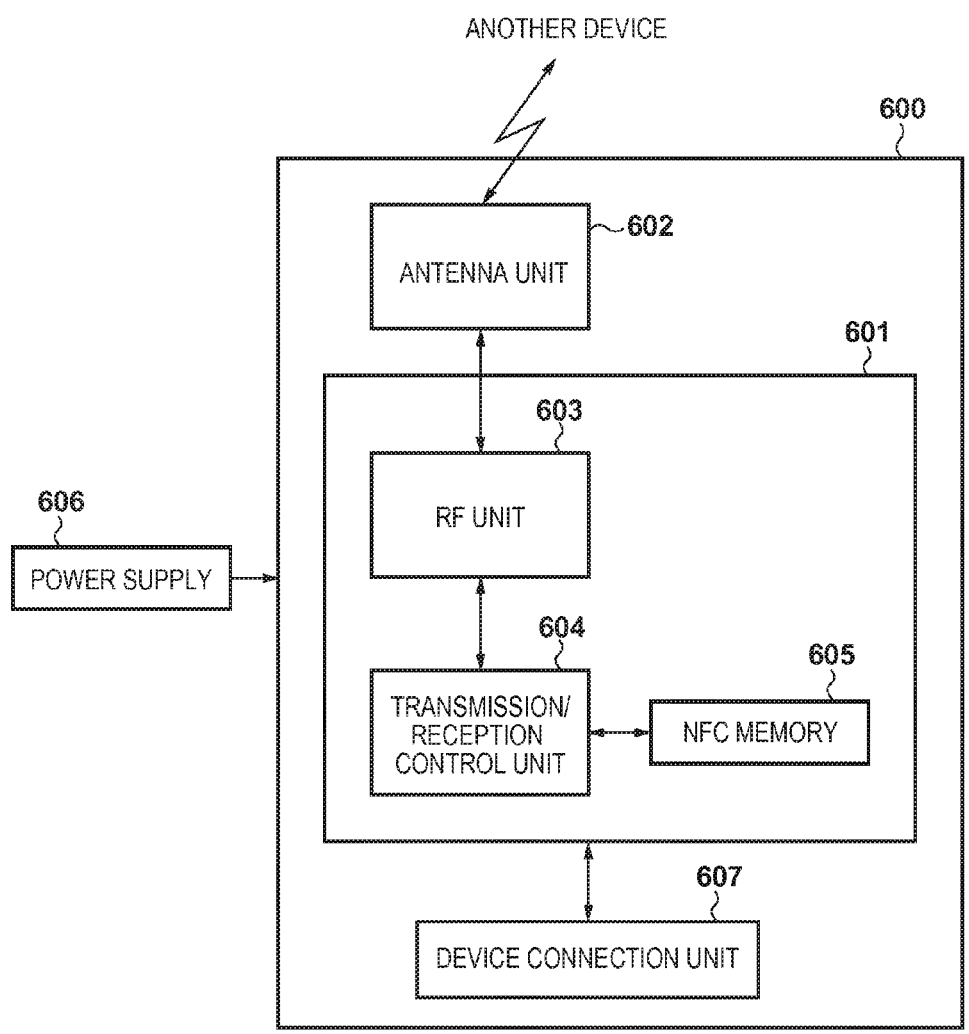
FIG. 6 is a block diagram showing the arrangement of an NFC unit.

FIG. 6 is a block diagram showing details of an NFC unit 600 used as the NFC unit 201 or 306. As for an implementation form, the NFC unit 600 is an internal or external unit of an implementation target apparatus.

In NFC communication, an apparatus which outputs an electromagnetic wave called an RF (Radio Frequency) field to start communication when performing short distance wireless communication using the NFC unit 600 is called an initiator. An apparatus which communicates with the initiator in response to a command issued by the initiator is called a target.

A passive mode and active mode will now be described. The communication mode of the NFC unit includes a passive mode and active mode. In the passive mode, the target responds to a command of the initiator by performing load modulation. It is, therefore, unnecessary to supply power to the target. On the other hand, in the active mode, the target responds to a command of the initiator by an RF field generated by the target itself. It is, therefore, necessary to supply power to the target. The active mode has as its feature the communication speed higher than that in the passive mode. Note that in the passive mode, the RF field generated by the initiator causes a current to flow through the coil of the target. The target can perform data communication using the current as power for data communication. Consequently, in the passive mode, even if a power supply such as a battery or AC power supply supplies no power to the target, the target can perform NFC communication with the initiator.

The NFC unit 600 includes an NFC controller unit 601, an antenna unit 602, an RF unit 603, a transmission/reception control unit 604, an NFC memory 605, a power supply 606, and a device connection unit 607. The antenna unit 602 receives radio waves and carriers from another NFC device, and transmits radio waves and carriers to another NFC device. The RF unit 603 has a function of modulating and/or demodulating an analog signal to a digital signal. The RF unit 603 includes a synthesizer, and controls bands and channels based on frequency assignment data by identifying the frequencies of the bands and channels.

Note that the NFC memory 605 is implemented by, for example, a nonvolatile memory. Even if the power supply supplies no power, it is possible to read/write data from/in the NFC memory 605. More specifically, data stored in the NFC memory 605 can be read/written by communication in the NFC passive mode, even if, for example, the remaining capacity of the battery of the terminal apparatus 200 has run out or no power is supplied to the printing apparatus 300.

The NFC controller unit 601 performs data storage control including an operation of reading/writing data from/in the NFC memory 605.

The transmission/reception control unit 604 executes control associated with transmission/reception, such as assembling and disassembling of a transmission/reception frame, appending and detection of a preamble, and identification of a frame. The transmission/reception control unit 604 also controls the NFC memory 605 to read/write various data and programs. When the NFC unit operates in the active mode, it receives power via the power supply 606 to communicate with a device via the device connection unit 607 and to communicate with another NFC device located within a communicable range by carriers transmitted/received via the antenna unit 602. When the NFC unit operates in the passive mode, it receives carriers from another NFC device via the antenna to receive power supplied from the other NFC device by electromagnetic induction, and transmits/receives data by performing communication with the other NFC device by modulating carriers.

Processing which can be implemented by a combination of a "specific state" of the terminal apparatus 200 and a "specific operation" of the operation key 307 of the printing apparatus 300 will be described below. This combination is not limited to those designated in the following description. Jobs such as copy and scan jobs generated by NFC communication will be referred to as "NFC jobs" hereinafter.

On the other hand, jobs other than NFC jobs are normal copy and scan jobs, and jobs for executing various processes such as printing from an external apparatus. In such jobs, the user intentionally performs a key operation, and it is necessary to immediately accept the key operation so as to prevent printing sheets and ink from being consumed when printing unintended by the user occurs. To the contrary, in an NFC job, the user can start the job without performing any key operation by bringing the terminal apparatus 200 closer to the printing apparatus 300, and an unintended operation may occur, unlike the normal job. In this embodiment, an arrangement for performing appropriate operations in NFC jobs and normal jobs other than the NFC jobs is implemented in consideration of the above situation. A detailed description will be provided below.

When the user executes printing in the above-described printing system, he/she activates, in the terminal apparatus 200, a program (for example, an application) for causing the printing apparatus 300 to perform printing. The user selects, via a display screen provided by the program, one or more images to be printed, and sets print setting information such as printing conditions. Then, the user brings the terminal apparatus 200 closer to the printing apparatus 300, thereby causing the terminal apparatus 200 to perform NFC communication. With this NFC communication, the image selected by the user and the print setting information set by the user are transmitted to the printing apparatus 300 as a print job. Upon receiving the print job, the printing apparatus 300 prints the image selected by the user according to the print setting information set by the user.

Note that the print job may be transmitted from the terminal apparatus 200 to the printing apparatus 300 by NFC communication, as described above, or may be transmitted by a handover.

The handover indicates, for example, a communication method of automatically switching communication from NFC communication to wireless LAN communication. More specifically, the NFC unit 201 of the terminal apparatus 200 receives connection information for performing connection via the wireless LAN from the NFC unit 306 of the printing apparatus 300. The connection information includes, for example, an SSID and password or a MAC address for performing connection to the wireless LAN unit 308 of the printing apparatus 300. When the terminal apparatus 200 receives the connection information, for example, the wireless LAN unit 202 of the terminal apparatus 200 searches for an apparatus on the LAN by broadcast, and establishes a wireless LAN connection to the apparatus corresponding to the connection information acquired by NFC communication.

With this processing, the user of the terminal apparatus 200 can establish a wireless LAN connection by bringing the terminal apparatus 200 closer to the printing apparatus 300 to execute NFC communication without making settings for connecting the printing apparatus 300 and the terminal apparatus 200 via the wireless LAN. That is, for example, after the user selects, on the screen of the terminal apparatus 200, an image to be printed, and makes print settings, he/she brings the terminal apparatus 200 closer to the NFC unit 306 of the printing apparatus 300 to establish a wireless LAN connection between the two apparatuses. After that, the terminal apparatus 200 transmits a print job to the printing apparatus 300 via the established wireless LAN connection.

Note that even when the printing apparatus 300 receives a print job via the wireless LAN by a handover, the job is also included in the above "NFC jobs".

Figure 17A:
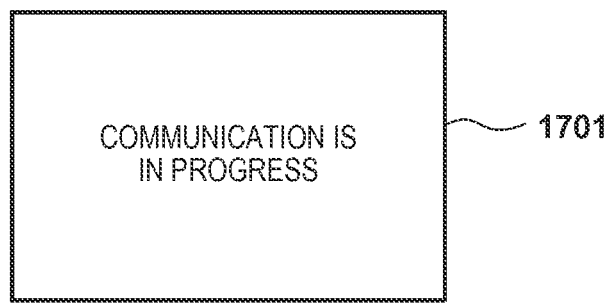
FIGS. 17A and 17B are views each showing an example of screen display for notifying that communication has been established.
Figure 17B:
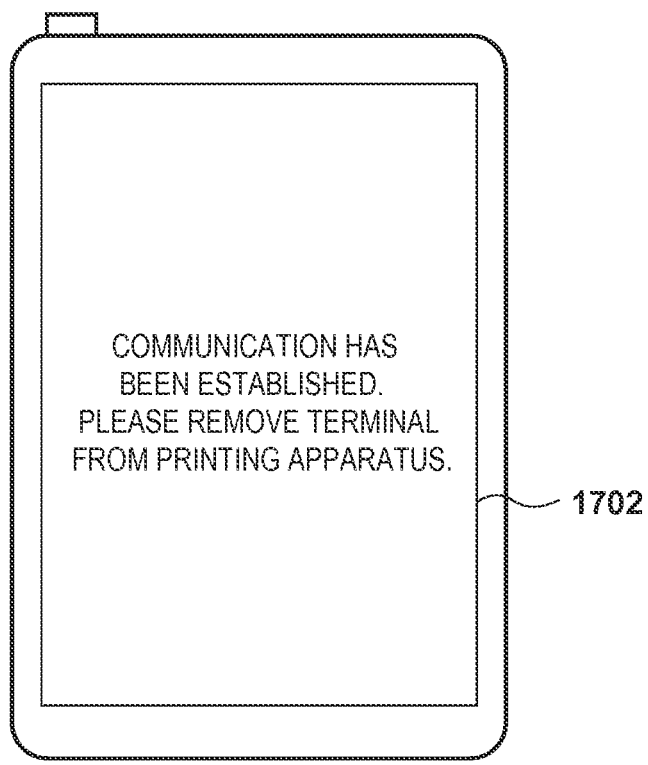

When NFC communication is established, a notification screen indicating that NFC communication has been established may be displayed on each of the display unit 203 of the terminal apparatus 200 and the operation display unit 305 of the printing apparatus 300. This display screen may be substituted by a general-purpose screen indicating that communication is in progress, which is provided by the OS of the terminal apparatus 200, or a dedicated screen provided by the application may be displayed. FIGS. 17A and 17B each show an example of screen display indicating establishment of NFC communication. FIG. 17A shows a screen 1701 indicating that communication is in progress, as a display example on the operation display unit 305 of the printing apparatus 300. FIG. 17B shows a notification screen 1702 indicating that NFC communication has been established, as a display example on the display unit 203 of the terminal apparatus 200.

As described above, the user can issue a print instruction by bringing the NFC unit 201 of the terminal apparatus 200 closer to the NFC unit 306 of the printing apparatus 300, thereby causing the printing apparatus 300 to execute printing.

Note that since the operation key 307 includes the electrostatic capacitance type switch, an electromagnetic wave generated by NFC communication may influence the switch. Consequently, even if the user does not touch the electrostatic capacitance type switch, an instruction for the switch may be erroneously input by NFC communication.

For example, in this embodiment, the electrostatic capacitance type switch for instructing to cancel printing is provided in the printing apparatus 300. Therefore, even if the user instructs printing by NFC communication, a print stop instruction may be erroneously input by NFC communication to unwantedly stop printing. In particular, if the operation key 307 is provided close to the NFC unit 306 in order to downsize the apparatus, the operation key 307 falls within the NFC communication range, thereby causing the above problem.

A factor of an input error of the operation key is not limited to the influence of an electromagnetic wave. For example, if the operation key 307 is provided close to the NFC unit 306, when the terminal apparatus 200 or a finger of the user holding the terminal apparatus 200 touches the operation key 307, an input error also occurs.

If a key input for canceling printing is detected when executing printing by NFC communication, the printing apparatus 300 according to this embodiment displays a screen for inquiring of the user whether to cancel printing. If the user permits cancellation of printing on the screen, processing of stopping printing is performed.

The above control processing will be described in detail with reference to FIGS. 7 and 8.

Figure 7:
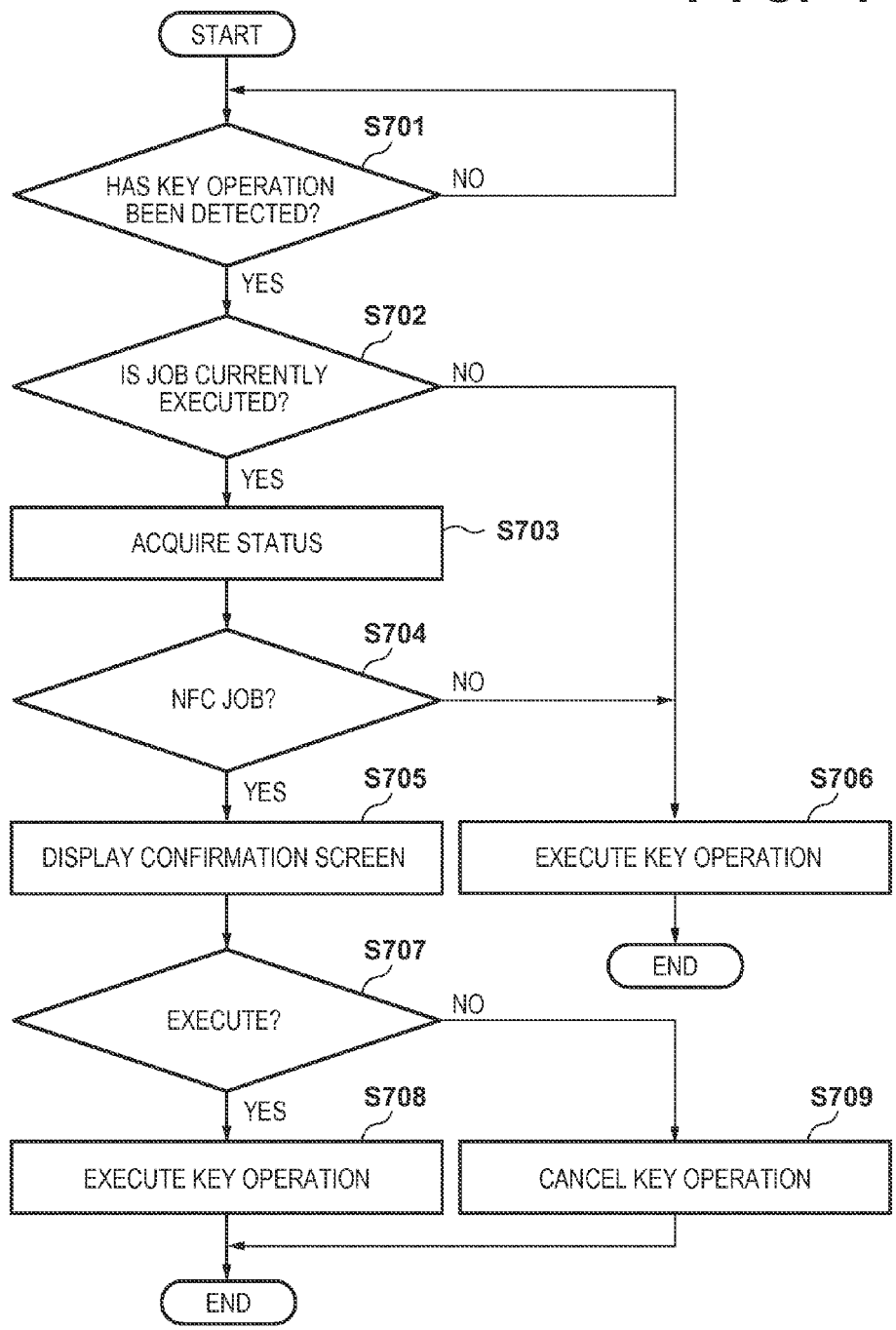
FIG. 7 is a flowchart illustrating processing executed according to the first embodiment.

FIG. 7 is a flowchart illustrating processing which is executed by the printing apparatus 300 in cooperation with the terminal apparatus 200. In this embodiment, an "NFC job execution state" is used as the "specific state", and an "operation of displaying a confirmation screen" is used as the "specific operation".

Note that the processing shown in FIG. 7 is executed by the CPU 311 of the printing apparatus 300. More specifically, the processing shown in FIG. 7 can be implemented when a program for implementing the processing shown in FIG. 7 is stored in the program memory 313 of the printing apparatus 300 and the CPU 311 executes the program on the data memory 314.

Upon power-on of the printing apparatus 300, the processing shown in FIG. 7 is executed. The processing is repeatedly executed until the power is turned off. A case in which the terminal apparatus 200 and the printing apparatus 300 use NFC communication and the printing apparatus 300 prints an image designated by the terminal apparatus 200 will be mainly described. Note that the present invention is not limited to printing by NFC communication. The processing shown in FIG. 7 is also executed when printing is executed without using NFC communication. For example, the processing is executed even when the user issues a print instruction using the operation display unit 305 or when a print job is received via the wireless LAN instead of using a handover.

Assume that the CPU 311 of the printing apparatus 300 executes the program for implementing the processing shown in FIG. 7, and also executes polling processing of always polling key operation detection by a handler module implemented in the program. The polling processing will be described later with reference to FIG. 8. Alternatively, the handler module may be implemented by the operation display unit control circuit 320.

After NFC communication is established, the terminal apparatus 200 transmits image data to the printing apparatus 300 by NFC communication or wireless LAN communication by a handover, thereby executing printing. Since, however, an erroneous key input operation may be performed by a print instruction using NFC communication, the CPU 311 determines in step S701 whether a key operation has been detected. This sets a state in which it is possible to always detect a key operation (pressing) by the user.

The polling processing for a key operation by the handler module implemented in the program used by the CPU 311 to execute the processing shown in FIG. 7 will now be described with reference to FIG. 8. In step S801, the handler module starts the processing shown in FIG. 7, and also starts polling for monitoring a key operation on the operation key 307 of the printing apparatus 300. In step S802, the handler module determines whether a key operation on the operation key 307 has been detected. If no key operation has been detected (NO in step S802), the process stands by for detection; otherwise (YES in step S802), the handler module notifies, in step S803, the CPU 311 that a key operation has been detected. In the processing in step S701, based on the presence/absence of a notification from the handler module, the CPU 311 determines whether a key operation has been detected. In this way, in the polling processing, a key operation is detected by performing detection (off-edge detection) of transition of the switch of the operation key 307 from an ON state to an OFF state.

If it is determined that no key operation has been detected (NO in step S701), the process stands by for detection. On the other hand, if a key operation has been detected (YES in step S701), that is, if the handler module notifies that a key operation has been detected (step S803), the CPU 311 determines in step S702 whether a job is currently executed. If no job is currently executed (NO in step S702), the CPU 311 executes an operation corresponding to the detected key operation in step S706. That is, the key operation is accepted as usual.

On the other hand, if a job is currently executed (YES in step S702), the CPU 311 acquires the status of the printing apparatus 300 in step S703. This status is acquired by referring to a parameter set in the job currently executed. Note that in this embodiment, if a job to be executed is an NFC job, flag processing of setting a flag indicating an NFC job as a parameter of the job is executed in parallel to the processing shown in FIG. 7. The flag processing will be described in detail later with reference to FIGS. 9A and 9B. This flag is stored in, for example, the data memory 314 together with the job.

In step S704, by referring to the parameter (flag) of the job included in the acquired status, the CPU 311 determines whether an NFC job is currently executed. If no NFC job is currently executed (NO in step S704), the CPU 311 executes an operation corresponding to the detected key operation in step S706. That is, in this case, the key operation detected in step S701 is not an erroneous operation caused by a print instruction using NFC communication, and is accepted as usual as an operation intended by the user.

On the other hand, if an NFC job is currently executed (YES in step S704), the CPU 311 displays, in step S705, a confirmation screen concerning the detected key operation on the operation display unit 305. In this case, it is determined that the user brought the terminal apparatus 200 closer to the printing apparatus 300 to perform printing using NFC, and kept the apparatuses close to each other even after the start of printing, and thus may have erroneously operated the key. If, for example, the terminal apparatus 200 remains close to the printing apparatus 300 even after the start of printing, a finger of the user holding the terminal apparatus 200 may touch the key by mistake. If the terminal apparatus 200 is placed on the key, the terminal apparatus 200 is in contact with the key when acceptance of the print cancel key is enabled at the start of printing, and thus a key operation may be accepted by mistake. Alternatively, the operation key may respond due to an electromagnetic wave generated by the NFC unit 201 of the terminal apparatus 200.

FIG. 10 shows an example of the confirmation screen displayed in step S705. A confirmation screen 1001 shown in FIG. 10 is a screen for confirming whether to execute the key operation, and includes an instruction portion for the key operation. This instruction portion includes a "YES" button for instructing to execute the key operation and a "NO" button for instructing to cancel the key operation.

If the confirmation screen is displayed in step S705, the CPU 311 accepts a user input and determines, in step S707, based on the user input, the presence/absence of an instruction about the key operation detected in step S701. If an instruction to execute the key operation has been issued (YES in step S707), that is, if the "YES" button has been pressed in the confirmation screen 1001 shown in FIG. 10, the CPU 311 accepts the key operation, and executes a corresponding operation in step S708. On the other hand, if an instruction to cancel the key operation has been issued (NO in step S707), that is, if the "NO" button has been pressed in the confirmation screen 1001 shown in FIG. 10, the CPU 311 cancels the key operation and prohibits execution of the operation corresponding to the key operation in step S709.

As described above, according to the processing shown in FIG. 7, if the user issues a print instruction by NFC, and performs a key operation, whether to execute processing corresponding to the key operation is confirmed with the user. The processing is then executed with the permission of the user. If the user does not permit execution of the processing, the key operation is disabled.

Therefore, even if a key operation unintended by the user is performed due to a print instruction by NFC for the above reason, it is possible to prevent processing corresponding to the key operation from being executed without the permission of the user. For example, if the key operation corresponds to a print cancel operation, it is possible to prevent printing from being canceled unintentionally.

As described with respect to step S704 of FIG. 7, if the job currently executed is not an NFC job, processing corresponding to the key operation is executed without displaying the confirmation screen in step S705. That is, if the job currently executed is not an NFC job, the probability that the user performs the key operation by mistake is lower than that when the job currently executed is an NFC job. Therefore, it is possible to immediately execute processing desired by the user by executing the processing corresponding to the key operation without displaying the confirmation screen. For example, if the user cancels printing immediately after a print instruction is issued using the operation display unit 305, it is possible to immediately cancel printing by operating the operation key.

The processing of setting and acquiring the status of the job currently executed will be described with reference to FIGS. 9A and 9B. Processes shown in FIGS. 9A and 9B are implemented by, for example, the NFC controller unit 601 of the NFC unit 306 of the printing apparatus 300 in parallel to the processes in steps S702 and S703.

It is necessary to acquire the status of the printing apparatus 300 in order to determine, if it is determined in step S701 that a key operation has been detected, whether the printing apparatus 300 currently executes a job and whether the job is that (NFC job) by NFC communication with the terminal apparatus 200.

Referring to FIG. 9A, when the printing apparatus 300 generates a job, the NFC controller unit 601 detects execution of the job in step S901. In this case, if the job is an NFC job, the NFC controller unit 601 sets, in step S902, a flag indicating an NFC job as a parameter of the job currently executed. After that, referring to FIG. 9B, in step S903, the NFC controller unit 601 accepts a job status acquisition request from the CPU 311 by a key operation (which corresponds to step S703). In step S904, the NFC controller unit 601 refers to the parameter of the job, and returns the contents to the CPU 311.

As described above, according to this embodiment, even if the user performs an erroneous key operation while the printing apparatus executes an NFC job, he/she can determine whether the key operation is intended or not. As a result, it is possible to prevent the printing apparatus from erroneously executing an operation unintended by the user.

That is, according to the processing shown in FIG. 7, if the job currently executed is an NFC job, the communication state of the NFC unit 306 is assumed to be a predetermined state (a state in which communication is in progress or a state immediately after communication). If the NFC unit 306 is in the predetermined state, it is determined that the operation key has been erroneously operated by an electromagnetic wave generated by NFC communication, or a user's finger or the terminal apparatus 200 which has been brought closer to the operation key for NFC communication. In this case, predetermined processing (for example, print cancel processing) corresponding to the operation key can be limited.

Note that the processing shown in FIG. 7 may be executed within a predetermined time after the start of printing. After the predetermined time elapses, even if the print job currently executed is an NFC job, the key operation may be immediately accepted without displaying the screen in step S705.

Whether a job is currently executed is determined in step S702 of FIG. 7 by determining whether the printing apparatus 300 currently receives a print job by NFC communication. Alternatively, after completion of reception of a print job, whether the job is currently executed is determined.

It may be determined whether the job is currently received or currently executed after reception of the job. That is, if the job is currently received by NFC communication or currently executed after completion of reception of the job, YES is determined in step S702.

In the processing shown in FIG. 7, if the print job currently executed is an NFC job, the processing (job cancel processing) corresponding to the operation on the operation key is limited. The present invention, however, is not limited to this. For example, the print cancel processing may be limited during execution of a print job (for example, a print job for issuing a print instruction by an operation on the operation display unit 305 of the printing apparatus 300) which is not an NFC job. More specifically, a job currently executed when the printing apparatus 300 accepts an NFC job may not be an NFC job. In this case, even if the operation key is operated, it is controlled not to cancel printing.

<Second Embodiment>

In the first embodiment, with respect to a key operation during execution of a job, whether to execute the key operation is determined based on a user input. The present invention, however, is not limited to this. To improve convenience, it may be necessary to further reduce the operation procedures of the user. To do this, in the second embodiment, an "NFC job execution state" is used as a "specific state" and an "operation of ignoring a key operation" is used as a "specific operation".

Figure 11:
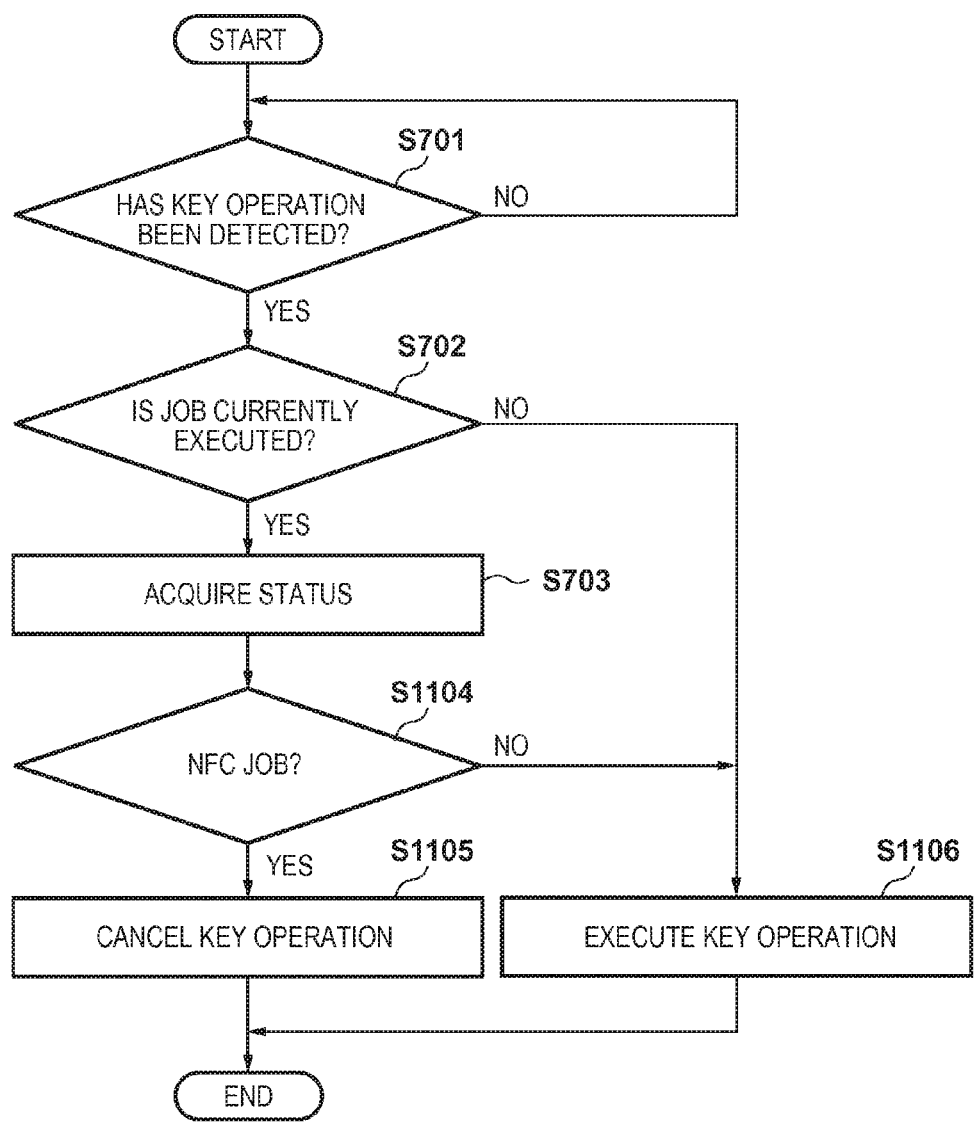
FIG. 11 is a flowchart illustrating processing executed according to the second embodiment.

FIG. 11 is a flowchart illustrating processing which is executed by a printing apparatus 300 in cooperation with a terminal apparatus 200. Note that the same step numbers as in FIG. 7 of the first embodiment denote the same processes in FIG. 11 and a detailed description thereof will be omitted.

After processes in steps S701 to S703, a CPU 311 determines in step S1104 whether an acquired status indicates that an NFC job is currently executed. If no NFC job is currently executed (NO in step S1104), the CPU 311 executes an operation corresponding to a detected key operation in step S1106. That is, in this case, the key operation detected in step S701 is not an erroneous operation caused by a print instruction using NFC communication, and is accepted as usual as an operation intended by the user.

On the other hand, if an NFC job is currently executed (YES in step S1104), the CPU 311 cancels the detected key operation and prohibits execution of the operation corresponding to the key operation in step S1105. In this case, it is determined that the user brought the terminal apparatus 200 closer to the printing apparatus 300 to perform printing using NFC, and kept the apparatuses close to each other even after the start of printing, and thus erroneously operated the key.

As described above, according to this embodiment, in addition to the effects described in the first embodiment, even if the user performs an erroneous key operation while the printing apparatus executes an NFC job, it is possible to automatically reject (ignore) the key operation.

<Third Embodiment>

In the third embodiment, an arrangement in which a "magnetic field detection state" is used as a "specific state" and an "operation of ignoring a key operation" is used as a "specific operation" will be described.

As described above, a factor of an erroneous key operation at the time of execution of an NFC job is an electromagnetic wave generated by NFC communication. In the third embodiment, whether a key operation is an erroneous operation unintended by the user is determined by detecting a magnetic field.

Figure 12:
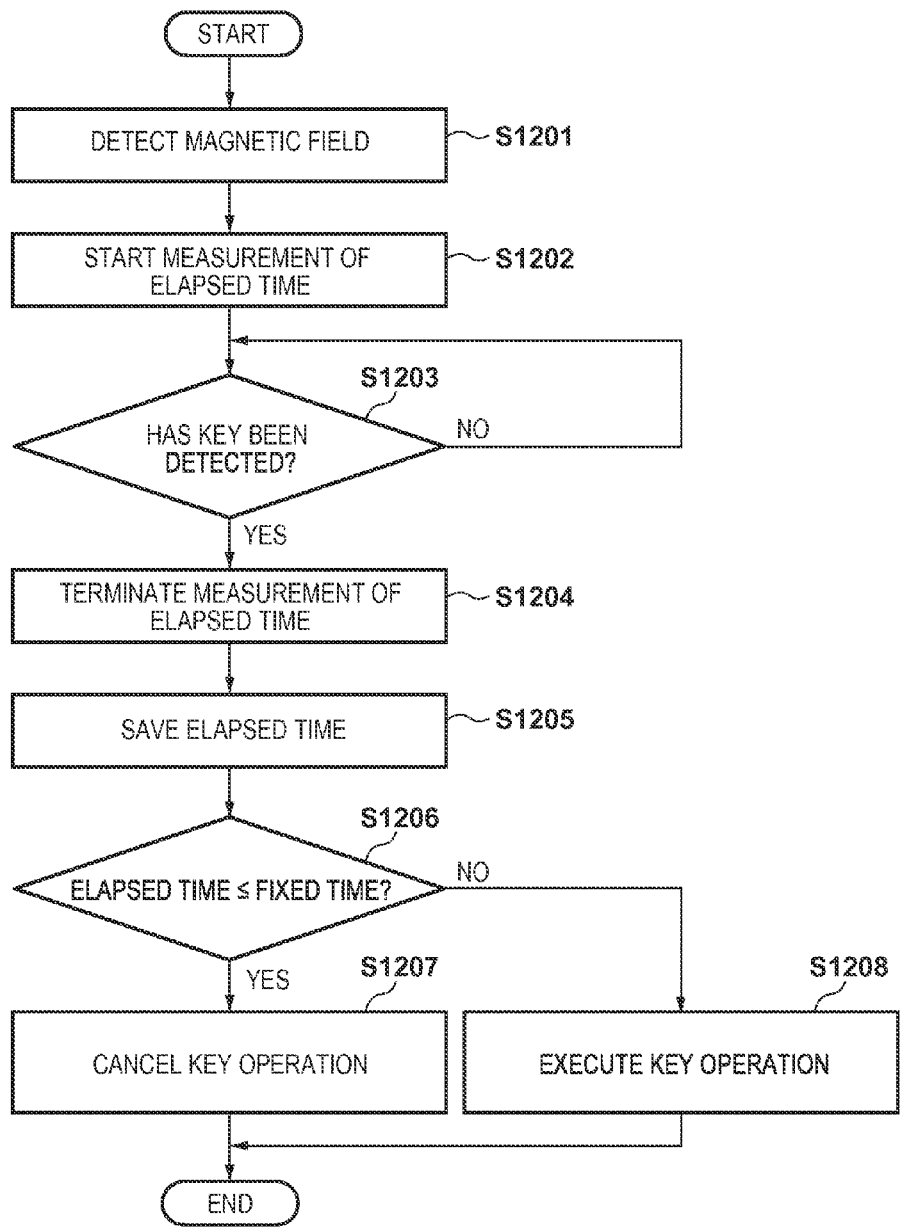
FIG. 12 is a flowchart illustrating processing executed according to the third embodiment.

FIG. 12 is a flowchart illustrating processing which is executed by a printing apparatus 300 in cooperation with a terminal apparatus 200.

Note that the processing shown in FIG. 12 is executed by a CPU 311 of the printing apparatus 300. More specifically, the processing shown in FIG. 12 can be implemented when a program for implementing the processing shown in FIG. 12 is stored in a program memory 313 of the printing apparatus 300 and the CPU 311 executes the program on a data memory 314.

Consider a case in which the terminal apparatus 200 and the printing apparatus 300 use NFC communication and the printing apparatus 300 prints an image designated by the terminal apparatus 200. Assume that the CPU 311 of the printing apparatus 300 executes the program for implementing the processing shown in FIG. 12, and also executes polling processing of always polling, by a handler module implemented in the program, key operation detection and detection of a magnetic field generated by NFC communication. The polling processing of key operation detection is as described with reference to FIG. 8. The polling processing of magnetic field detection will be described later with reference to FIG. 13.

Figure 13:
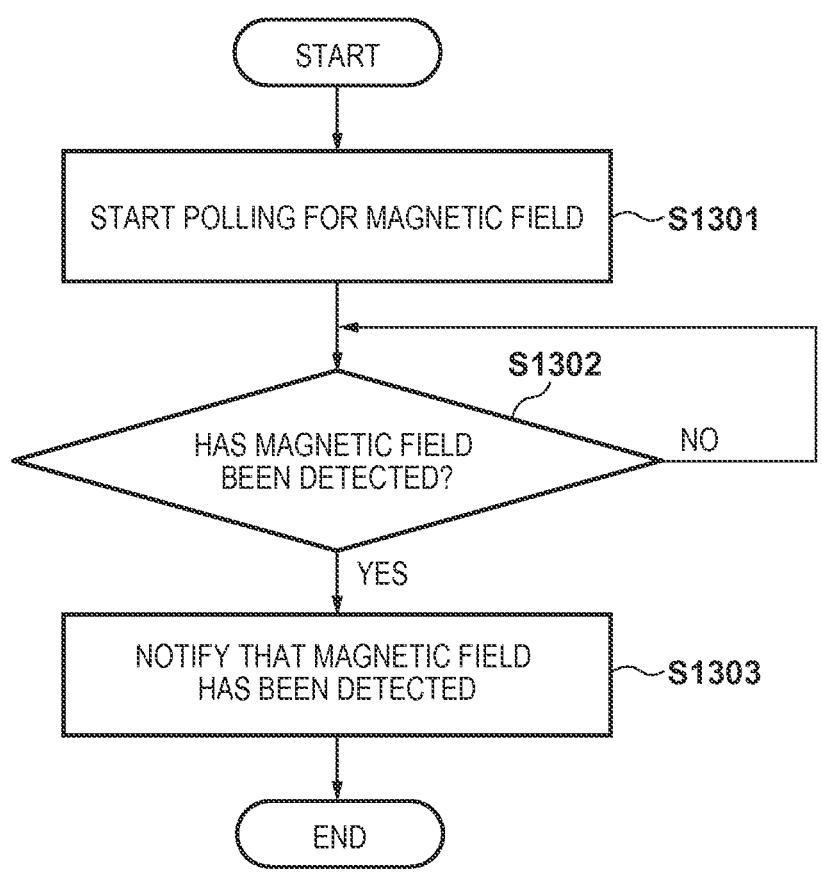
FIG. 13 is a flowchart illustrating the polling processing for detecting a magnetic field.

The polling processing for a key operation by the handler module implemented in the program used by the CPU 311 to execute the processing shown in FIG. 7 will be described with reference to FIG. 13. Note that the handler module can be implemented by an NFC controller unit 601 of an NFC unit 306 of the printing apparatus 300.

In step S1301, the handler module starts the processing shown in FIG. 7, and also starts polling for monitoring a magnetic field which is generated by the printing apparatus 300 by NFC communication when the terminal apparatus 200 is brought closer to the printing apparatus 300. In step S1302, the handler module determines whether a magnetic field by NFC communication has been detected. If no magnetic field has been detected (NO in step S1302), the process stands by for detection; otherwise (YES in step S1302), the handler module notifies, in step S1303, the CPU 311 that the magnetic field has been detected. In response to this, in step S1201, the CPU 311 detects the magnetic field based on the notification from the handler module.

Note that the magnetic field is detected by the NFC unit 306, and the CPU 311 is notified of it via an NFC control circuit 319 which controls the NFC unit 306. Upon detection of the magnetic field, the CPU 311 starts, in step S1202, measurement of an elapsed time after the magnetic field is detected.

After NFC communication is established, the terminal apparatus 200 transmits image data to the printing apparatus 300 to execute printing. However, an erroneous key operation by the user may be detected during printing. Therefore, after the start of measurement of the elapsed time in step S1202, the CPU 311 determines in step S1203 whether a key operation has been detected. This sets a state in which it is possible to always detect a key operation (pressing) by the user.

If it is determined that no key operation has been detected (NO in step S1203), the process stands by for detection. On the other hand, if a key operation has been detected (YES in step S1203), that is, if the handler module notifies that a key operation has been detected (step S803), the CPU 311 terminates measurement of the elapsed time in step S1204. In step S1205, the CPU 311 saves the elapsed time from magnetic field detection to key operation detection in a data memory 214.

In step S1206, the CPU 311 determines whether the measured elapsed time is equal to or shorter than a preset time. If the elapsed time is equal to or shorter than the preset time (YES in step S1206), the CPU 311 cancels the detected key operation and prohibits execution of a corresponding operation in step S1207. In this case, it is determined that when the user brought the terminal apparatus 200 closer to the printing apparatus 300 to perform printing using NFC, he/she simultaneously operated the key by mistake due to the proximity to the printing apparatus 300. Therefore, the preset time is set to be sufficiently short so as to determine that the user has performed an operation by mistake due to the proximity to the apparatus.

On the other hand, if the elapsed time is longer than the preset time (NO in step S1206), the CPU 311 executes the operation corresponding to the detected key operation in step S1208. That is, in this case, it is determined that the proximity by NFC is irrelevant to the key operation detected in step S1203, thereby accepting the key operation as usual.

As described above, according to this embodiment, even if the user unwantedly performs an erroneous operation by an operation of bringing the terminal apparatus closer to the printing apparatus, the key operation can be automatically rejected.

That is, if a key operation is detected immediately after a magnetic field is detected, it is considered that a key (for example, an electrostatic capacitance type switch) has responded due to the influence of the magnetic field. For example, it is considered that the key operation has been accepted due to an electromagnetic wave generated by an NFC unit 201 of the terminal apparatus 200. In this case, the key operation can be canceled.

Furthermore, if a key operation is detected when a long time elapses after a magnetic field is detected, processing corresponding to the key operation is executed. If, for example, the printing apparatus 300 is used in an environment in which many magnetic fields are generated, a magnetic field may be detected without performing NFC communication. According to the processing shown in FIG. 12, even in such environment, it is possible to execute processing corresponding to a key operation performed by the user by considering that the key operation has not been caused by a magnetic field.

<Fourth Embodiment>

In the third embodiment, detection of a magnetic field is used as a criterion to determine whether NFC communication is in progress. In the fourth embodiment, whether NFC communication has been performed is determined depending on whether a write operation has been performed in the NFC memory of a printing apparatus 300. If NFC communication has been performed, a key operation may have been erroneously performed by NFC communication, and thus a confirmation screen is displayed to the user. In the fourth embodiment, a "data write state" is used as a "specific state" and an "operation of displaying a confirmation screen" is used as a "specific operation".

That is, in the fourth embodiment, the following operation is controlled when the printing apparatus 300 detects the presence/absence of a data write request by NFC communication from a terminal apparatus 200.

Figure 15:
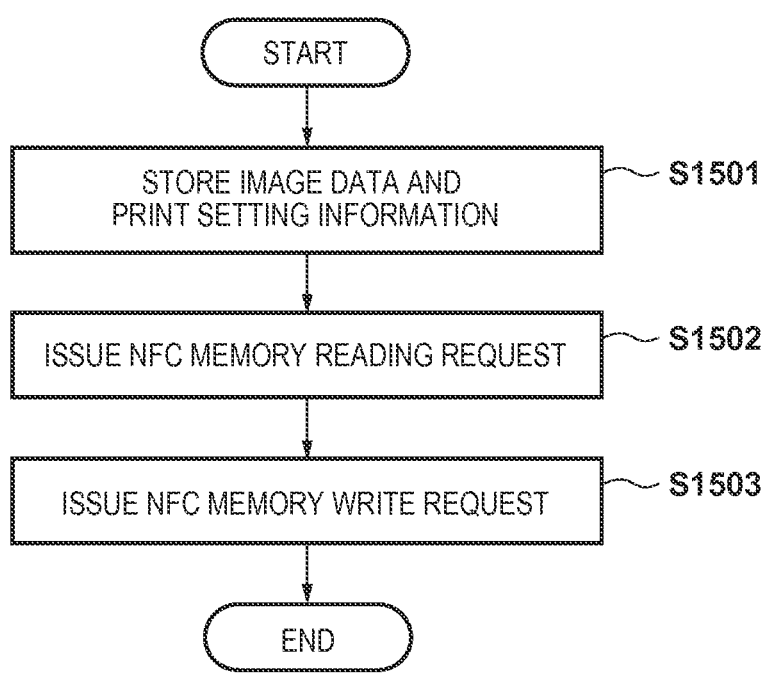
FIG. 15 is a flowchart illustrating processing of instructing a write request in a terminal apparatus.

The operation of the terminal apparatus 200 will be described with reference to FIG. 15. Note that the processing shown in FIG. 15 is executed by a CPU 211 of the terminal apparatus 200. More specifically, the processing shown in FIG. 15 can be implemented when a program for implementing the processing shown in FIG. 15 is stored in a program memory 213 of the terminal apparatus 200 and the CPU 211 executes the program on a data memory 214.

To execute printing in the printing apparatus 300 from the terminal apparatus 200, the user selects, via a print setting screen for printing by the printing apparatus 300 provided by the program operating on the terminal apparatus 200, one or more images to be printed, and sets print setting information such as printing conditions. In response to this, in step S1501, the CPU 211 stores the selected image to be printed and the print setting information in an NFC memory 605. In step S1502, the CPU 211 issues a reading request to the NFC memory 605 of the NFC unit 201. In step S1503, the CPU 211 reads out contents from the NFC memory 605, and then issues a write request to the NFC memory 605 of the printing apparatus 300. That is, the CPU 211 causes an NFC unit 201 to generate an RF field corresponding to the image and print setting information. If the user brings the terminal apparatus 200 closer to the printing apparatus 300 in this state, the image and print setting information are written in the NFC memory 605 of the printing apparatus 300.

Figure 14:
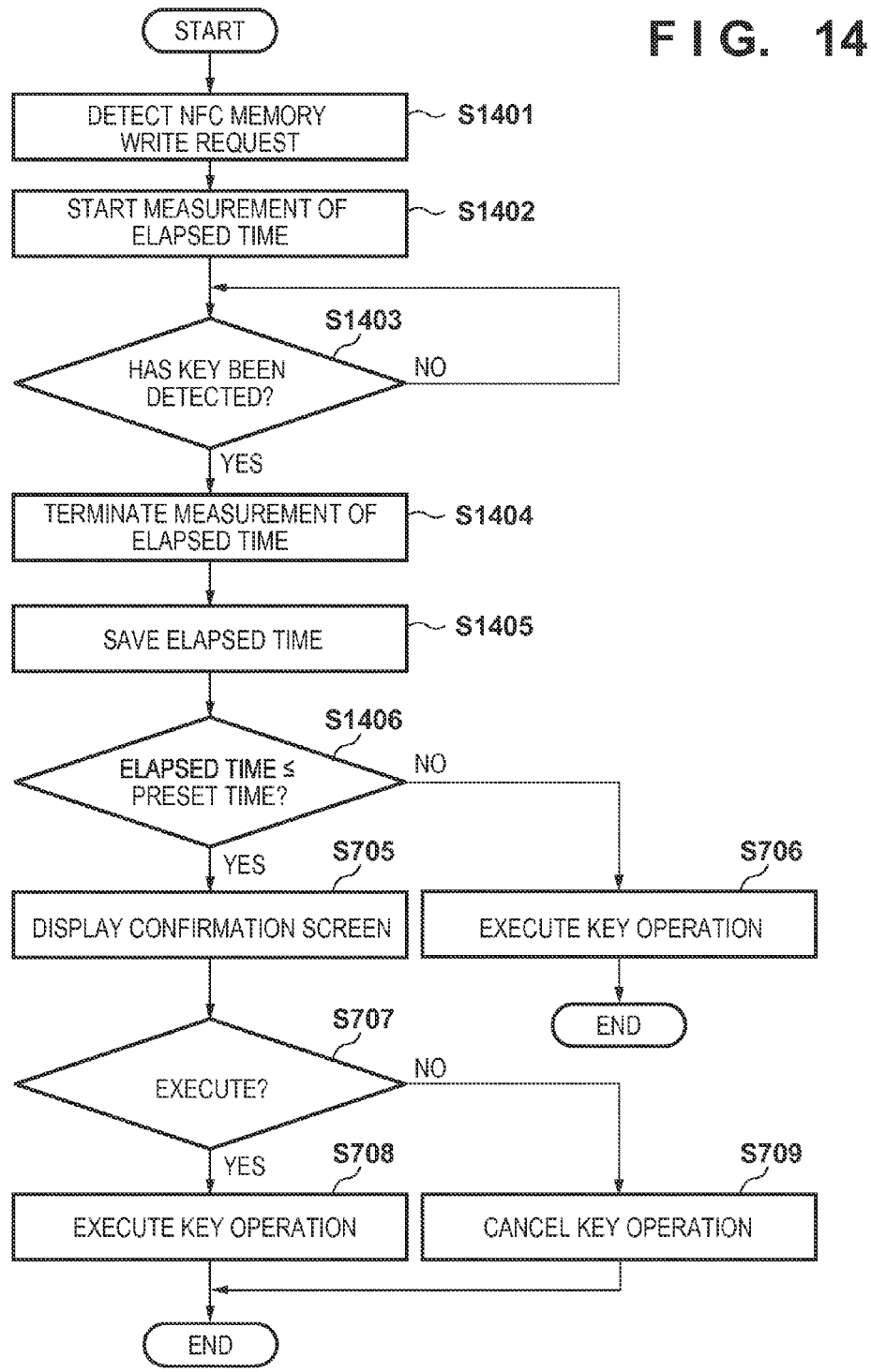
FIG. 14 is a flowchart illustrating processing executed according to the fourth embodiment.

FIG. 14 is a flowchart illustrating processing which is executed by the printing apparatus 300 in cooperation with the terminal apparatus 200. Note that the same step numbers as in FIG. 7 of the first embodiment denote the same processes in FIG. 14 and a detailed description thereof will be omitted.

In step S1401, in response to the processing in step S1503 of FIG. 15, a CPU 311 detects the data write request to the NFC memory 605 of the printing apparatus 300. Processes in steps S1402 to S1406 are obtained by replacing processes of measuring, terminating, and saving an elapsed time after a magnetic field is detected in steps S1202 to S1206 of FIG. 12 according to the third embodiment by processes of measuring, terminating, and saving an elapsed time after the data write request is detected. Details of these processes will be omitted.

After that, processes in steps S705 to S709 or processing in step S706 is executed according to a determination result in step S1406.

As described above, according to this embodiment, even if the user unwantedly performs an erroneous key operation by an operation of bringing the terminal apparatus closer to the printing apparatus, he/she can determine whether the key operation is intended or not. As a result, it is possible to prevent the printing apparatus from executing an operation unintended by the user.

That is, in the fourth embodiment, whether NFC communication has been performed is determined depending on whether a write operation has been performed in the NFC memory of the printing apparatus 300. If NFC communication has been performed, a key operation may have been erroneously performed by NFC communication, and thus a confirmation screen is displayed to the user. This can prevent processing unintended by the user from being executed.

In the above example, a case in which an NFC unit 306 of the printing apparatus 300 receives the image and print setting information by NFC communication has been exemplified as an NFC job. The present invention, however, is not limited to this. The image and print setting information may be received via a wireless LAN by a handover. In this case, in NFC communication, connection information (an SSID and password, a MAC address, or the like) for wireless LAN connection is read out from the NFC unit 306 of the printing apparatus 300. Therefore, when a handover is used, it may be detected in step S1401 of FIG. 14 that connection information has been read out. In this case as well, since it can be determined that NFC communication has been performed, it is possible to prevent execution of processing corresponding to a key operation erroneously input due to NFC communication.

<Fifth Embodiment>

When referring to a "specific state", both the communication state and job state of an apparatus may be referred to. In the fifth embodiment, an arrangement in which a "magnetic field detection state" and "NFC job execution state" are used as "specific states" and an "operation of ignoring a key operation" is used as a "specific operation" will be described.

FIG. 16 is a flowchart illustrating processing which is executed by a printing apparatus 300 in cooperation with a terminal apparatus 200.

Note that the processing shown in FIG. 16 is executed by a CPU 311 of the printing apparatus 300. More specifically, the processing shown in FIG. 16 can be implemented when a program for implementing the processing shown in FIG. 16 is stored in a program memory 313 of the printing apparatus 300 and the CPU 311 executes the program on a data memory 314. The same step numbers as in FIG. 7 of the first embodiment or FIG. 12 of the third embodiment denote the same processes in FIG. 16 and a detailed description thereof will be omitted.

After the processes in steps S1201 to S1205 and the processes in steps S702 to S704, the CPU 311 determines in step S1609 whether a measured elapsed time is equal to or shorter than a preset time. If the elapsed time is equal to or shorter than the preset time (YES in step S1609), the CPU 311 cancels a detected key operation and prohibits execution of a corresponding operation in step S1610. In this case, it is determined that when the user brought the terminal apparatus 200 closer to the printing apparatus 300 to perform printing using NFC, he/she simultaneously operated the key by mistake due to the proximity to the printing apparatus 300. Therefore, the preset time is set to be sufficiently short so as to determine that the user has performed an operation by mistake due to the proximity to the apparatus.

On the other hand, if the elapsed time is longer than the preset time (NO in step S1609), the CPU 311 executes the operation corresponding to the detected key operation in step S1611. That is, in this case, it is determined that the proximity by NFC is irrelevant to the key operation detected in step S1203, thereby accepting the key operation as usual.

As described above, according to this embodiment, even if the user unwantedly performs an erroneous key operation by an operation of bringing the terminal apparatus closer to the printing apparatus, the key operation can be automatically rejected under the plurality of conditions.

<Sixth Embodiment>

The above-described first to fifth embodiments are merely examples, and an embodiment can be implemented by arbitrarily combining the first to fifth embodiments according to the application and purpose.

In the above embodiments, NFC communication has been assumed to provide a description. The present invention, however, is not always limited to NFC communication, and is applicable to other predetermined communication schemes, for example, a short distance wireless communication scheme of implementing communication within a predetermined distance range, such as Bluetooth® and BLE (Bluetooth Low Energy). More specifically, the present invention is also applicable to an apparatus having the communication function using a predetermined communication scheme which may cause an operation error for the operation key of a printing apparatus when executing processing using the short distance wireless communication scheme.

In the above embodiments, the electrostatic capacitance type touch key has been exemplified as an operation key. The present invention, however, is not limited to this. For example, an electrostatic capacitance type touch panel or a pressure sensitive type touch key or touch panel may be used. Alternatively, a button pressed by the user, a stick device, or a wheel device may be used.

According to this embodiment, it is possible to prevent processing unintended by the user from being executed by touching various kinds of operation devices with a finger of the user or a terminal apparatus 200 when the terminal apparatus 200 is brought closer to a printing apparatus 300 for close proximity wireless communication.

In the above embodiments, a key operation of the printing apparatus when the printing function of the printing apparatus 300 is used to execute printing from the terminal apparatus 200 is controlled. The present invention, however, is not limited to this.

For example, even if the FAX function of the printing apparatus 300 is used, the above embodiments are applicable. That is, it is possible to control a key operation of the printing apparatus when the FAX function of the printing apparatus 300 is used to execute FAX transmission from the terminal apparatus 200.

Similarly, even if the reading function of the printing apparatus 300 is used, the above embodiments are applicable. That is, it is possible to control a key operation of the printing apparatus when the reading function of the printing apparatus 300 is used to execute reading (scanning) from the terminal apparatus 200.

As described above, by using the function of the printing apparatus, it is possible to control a key operation of the printing apparatus at the time of execution of a job for using the function when the function is used in a "predetermined state" and "predetermined operation".

This can prevent the printing apparatus from erroneously executing an operation by a key operation unintended by the user.

Note that in the above embodiments, job cancel processing has been exemplified as processing executed by a key operation. The present invention, however, is not limited to this. The operation key may be a power key, and the printing apparatus 300 may be powered off by operating the power key. According to this embodiment, it is possible to prevent the power from being turned off against the user's intention due to a print instruction by NFC communication.

In the above embodiments, printing by the printing apparatus has been exemplified as predetermined processing executed by a job. The present invention, however, is not limited to this. For example, the contents described in this embodiment are applicable to various processes such as data transmission by the communication apparatus.

According to the present invention, it is possible to provide a technique capable of preventing processing unintended by the user from being executed in processing including communication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-163046, filed Aug. 8, 2014, which is hereby incorporated by reference herein in its entirety.

What is claimed is:

1. A communication apparatus comprising:
an operation unit configured to be operated by a user;
a communication unit configured to perform close proximity wireless communication;
a detection unit configured to detect an operation for the operation unit;
a display unit configured to display, if the detection unit detects the operation and the communication unit has executed close proximity wireless communication with an external apparatus, a confirmation screen for confirming execution of processing corresponding to the operation for the operation unit; and
a control unit configured to control the processing corresponding to the operation for the operation unit in accordance with an instruction of the user for the screen displayed by the display unit.

2. The apparatus according to claim 1, wherein if the detection unit detects the operation and a job received from the external apparatus based on communication executed by the communication unit is currently executed, the display unit displays the confirmation screen.

3. The apparatus according to claim 2, wherein the processing corresponding to the operation for the operation unit is processing of canceling the job.

4. The apparatus according to claim 2, wherein if the detection unit detects the operation and a job which is not received based on communication executed by the communication unit is currently executed, the display unit does not display the confirmation screen and the control unit executes the processing corresponding to the operation for the operation unit.

5. The apparatus according to claim 2, further comprising:
a printing unit configured to print an image,
wherein if the detection unit detects the operation and a print job, for printing by the printing unit, received from the external apparatus based on communication executed by the communication unit is currently executed, the display unit displays the confirmation screen.

6. The apparatus according to claim 5, wherein an image to be printed and print setting are received as the print job.

7. The apparatus according to claim 5, wherein an image to be printed and print setting are received via the close proximity wireless communication.

8. The apparatus according to claim 1, wherein if the detection unit detects the operation and the communication unit currently executes no communication, the display unit does not display the confirmation screen and the control unit executes the processing corresponding to the operation for the operation unit.

9. The apparatus according to claim 8, wherein the control unit executes the processing corresponding to the operation for the operation unit if the instruction of the user for the confirmation screen is a first instruction, and does not execute the processing if the instruction is a second instruction.

10. The apparatus according to claim 1, wherein if the detection unit detects the operation after communication by the communication unit starts, the display unit displays the confirmation screen.

11. The apparatus according to claim 1, further comprising:
a determination unit configured to determine a state of the communication unit,
wherein if the detection unit detects the operation, and the state of the communication unit determined by the determination unit is a predetermined state in which close proximity wireless communication with the external apparatus has been executed, the control unit limits the processing corresponding to the operation for the operation unit.

12. The apparatus according to claim 11, wherein the communication unit performs close proximity wireless communication with the external apparatus by a magnetic field, and the determination unit determines, if the magnetic field is detected, that the state of the communication unit is the predetermined state.

13. The apparatus according to claim 11, further comprising:

a write unit configured to write, in a memory, information received by the communication unit from the external apparatus, wherein if the write unit writes the information in the memory, the determination unit determines the predetermined state.

14. The apparatus according to claim 1, wherein the communication unit performs close proximity wireless communication by NFC (Near Field Communication).

15. The apparatus according to claim 1, wherein the communication unit performs close proximity wireless communication by an electromagnetic wave, and the operation unit is one of an electrostatic capacitance type touch key and an electrostatic capacitance type touch panel.

16. The apparatus according to claim 15, wherein even if the detection unit detects the operation and the communication unit has executed close proximity wireless communication with an external apparatus, in a case where time from time determined based on the close proximity wireless communication to time determined based on the detection of the operation is longer than a predetermined period, the display unit does not display the confirmation screen and the control unit executes the processing corresponding to the operation for the operation unit.

17. The apparatus according to claim 16, further comprising a measuring unit configured to measure time from detecting a request from the external apparatus for writing to a memory by the close proximity wireless communication, wherein in a case where time measured by the measuring unit is longer than the predetermined period, the display unit does not display the confirmation screen and the control unit executes the processing corresponding to the operation for the operation unit.

18. A control method for a communication apparatus including an operation unit and a communication unit configured to perform close proximity wireless communication, comprising:

detecting an operation for the operation unit for being operated by a user;

displaying, if the operation is detected and the communication unit has executed close proximity wireless communication with an external apparatus, a confirmation screen for confirming execution of processing corresponding to the operation for the operation unit; and controlling the processing corresponding to the operation for the operation unit in accordance with an instruction of the user for the screen displayed in the displaying.

19. A non-transitory computer-readable storage medium storing a computer program for causing a computer comprised in a communication apparatus execute a control method, wherein the communication apparatus comprises an operation unit and a communication unit configured to perform close proximity wireless communication, the control method comprising:

detecting an operation for the operation unit for being operated by a user;

displaying, if the operation is detected and the communication unit has executed close proximity wireless communication with an external apparatus, a confirmation screen for confirming execution of processing corresponding to the operation for the operation unit; and controlling the processing corresponding to the operation for the operation unit in accordance with an instruction of the user for the screen displayed in the displaying.

* * * * *